(No Model.) 3 Sheets—Sheet 1.
O. B. STILLMAN.
EVAPORATING APPARATUS.
No. 483,817. Patented Oct. 4, 1892.
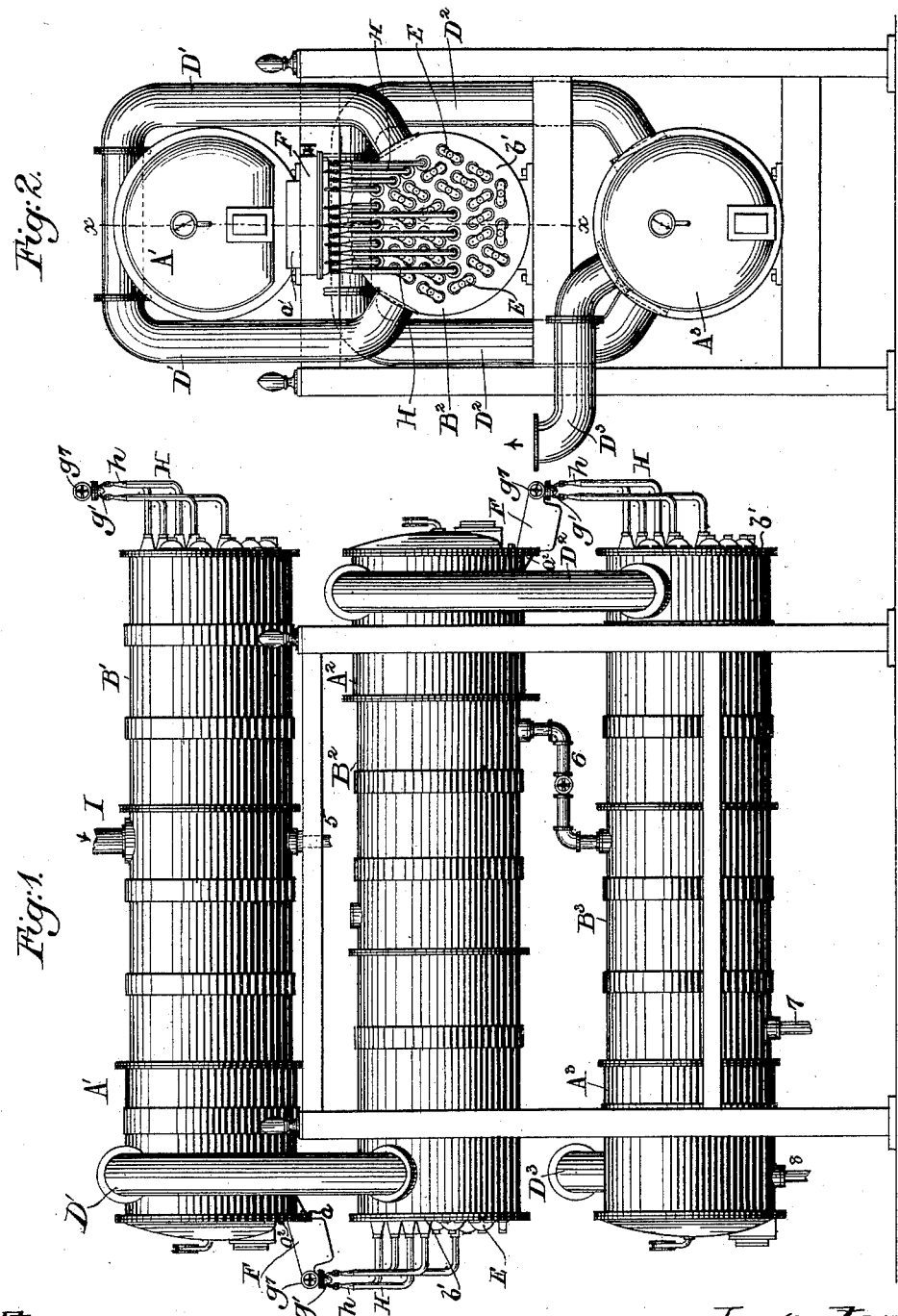

(No Model.) 3 Sheets—Sheet 2.
O. B. STILLMAN.
EVAPORATING APPARATUS.
No. 483,817. Patented Oct. 4, 1892.
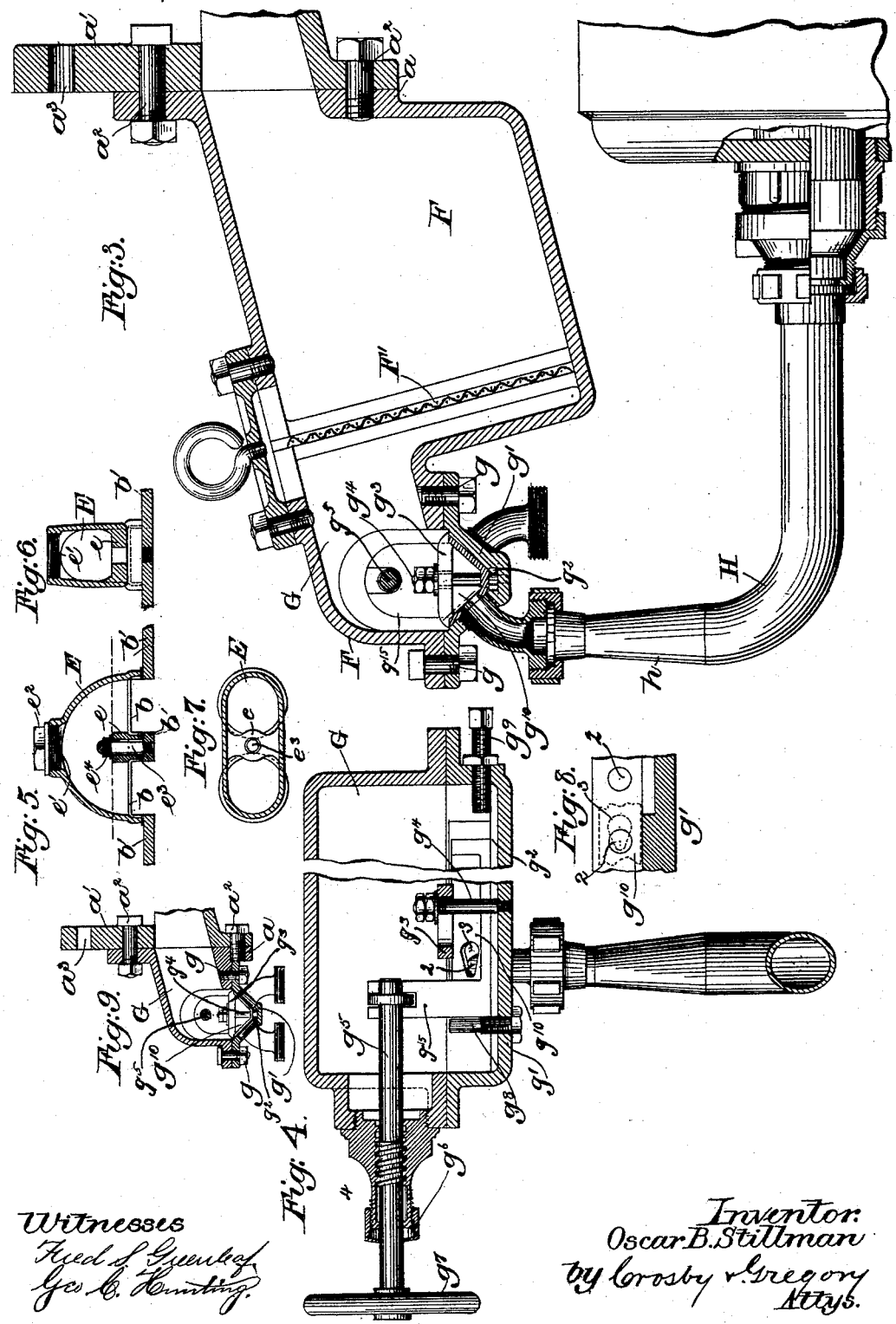
Witnesses
Fred L. Guenther
Geo. E. Hunting
Inventor:
Oscar B. Stillman
by Crosby & Gregory
Attys.

(No Model.) 3 Sheets—Sheet 3.
O. B. STILLMAN.
EVAPORATING APPARATUS.
No. 483,817. Patented Oct. 4, 1892.
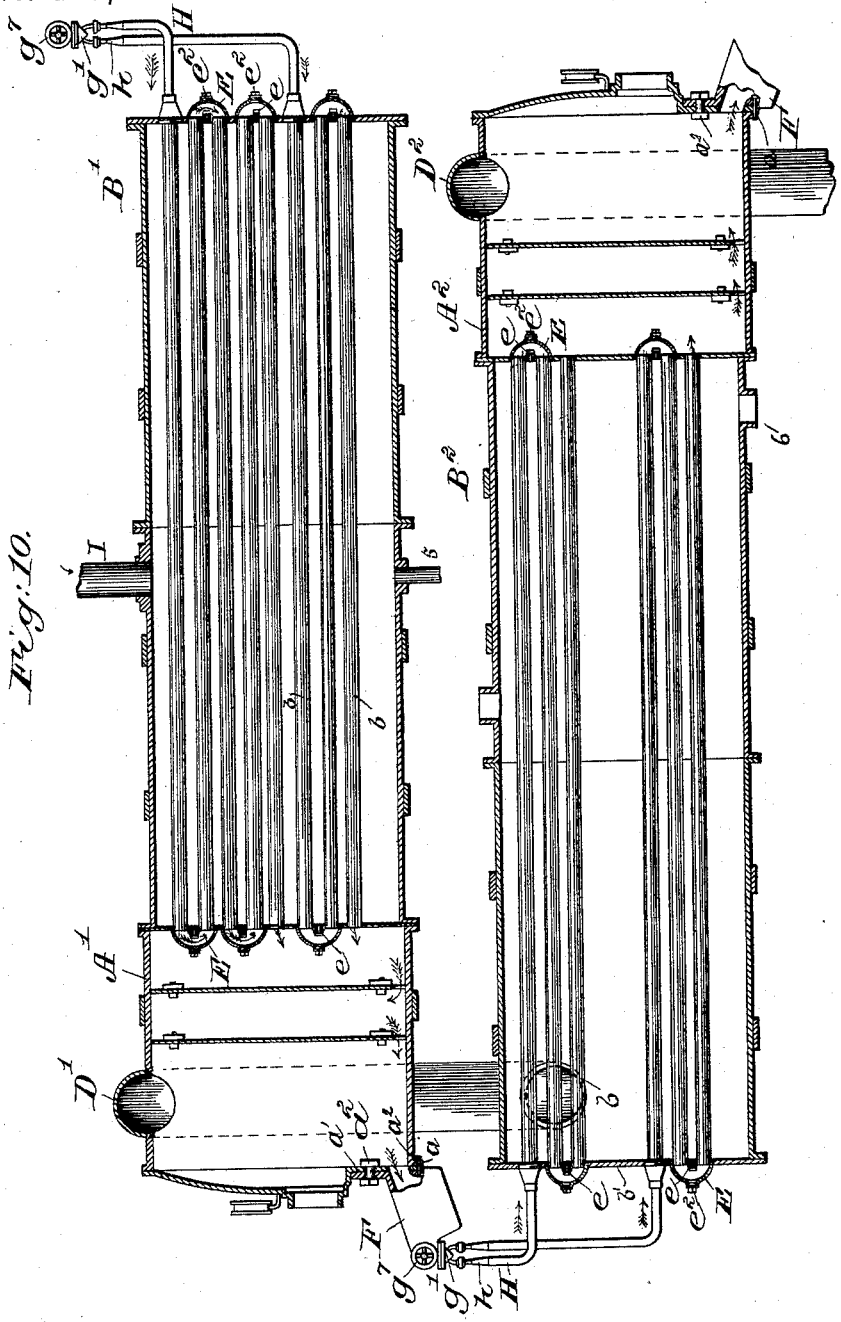
Witnesses.
Fred S. Greenleaf
Edward F. Allen.
Inventor:
Oscar B. Stillman
by Crosby & Gregory
Attys.

UNITED STATES PATENT OFFICE.

OSCAR B. STILLMAN, OF NATICK, MASSACHUSETTS.

EVAPORATING APPARATUS.

SPECIFICATION forming part of Letters Patent No. 483,817, dated October 4, 1892.

Application filed September 5, 1890. Serial No. 364,013. (No model.)

*To all whom it may concern:*

Be it known that I, OSCAR B. STILLMAN, of Natick, county of Middlesex, State of Massachusetts, have invented an Improvement in Evaporating Apparatus, of which the following description, in connection with the accompanying drawings, is a specification, like letters and figures on the drawings representing like parts.

This invention has for its object to improve the construction and thereby the operation of that class of vacuum evaporating apparatus exhibited in United States Patent No. 383,384, dated May 22, 1888.

One part of my invention relates to what I call the "distributing-chamber" and its valves, the said chamber forming a continuation of the separating-chamber attached to the heating-cylinders, the said cylinders being preferably arranged in vertical series. I prefer in some instances to interpose a strainer-box between the separating and distributing chambers; but the connection between the distributing-chamber and the separating-chamber may be direct and so as to form a part thereof.

My improved apparatus is so constructed and arranged that the flow of the liquid is substantially continuous in one direction and is always aided in that direction by gravity, thus enabling the liquid to have a continuous velocity, due not only to difference of vacuum as in said class of evaporators, but also due to the continuous action of gravity. By the valves within the distributing-chamber the liquid to flow from one to the other effect is evenly distributed in each of the coils contained in the following effect and in desired quantity. The valve of each distributing-chamber is adapted, as shown, to simultaneously open or close, more or less, all the outlets therefrom, and, as shown, the outlets therefrom and the passages through the valve are made to differ in shape, one being substantially circular and the other being preferably elliptical, as by such difference in shape finer and more complete control as to the effective size of the liquid-passages may be had. The valve referred to is adapted to be operated from outside the chamber containing it. The tubes of the heating-chamber are connected at each end by peculiar return-bends, to be described, to thus form coils and enable access to be readily had to any coil for examination and cleaning.

My invention consists, essentially, in an evaporating apparatus containing adjacent heating-chambers and separating-chambers arranged in series of two or more, a distributing-chamber interposed between a separating-chamber of one effect and a heating-chamber of the next effect, a continuous horizontal delivery-channel in the bottom of the distributing-chamber, a series of independent distributing-pipes leading from the bottom of said channel, the delivery ends of said pipes being connected one to each coil of a following effect, and a valve to simultaneously control the admission of a uniform quantity of liquid from the said distributing-chamber into each distributing pipe and coil, substantially as will be described.

Other features of my invention will be pointed out in the claims at the end of this specification.

Figure 1 is a side elevation of a vacuum evaporating apparatus embodying my invention. Fig. 2 is a left-hand end view of the apparatus shown in Fig. 1. Fig. 3 is an enlarged view showing the head of the separating-chamber with the straining and distributing chamber and one of the connecting-pipes between the distributing-chamber and the entrance-tube of one of the coils of the following effect, five tubes usually forming a coil. Fig. 4 is a longitudinal sectional detail of the distributing-chamber, partially broken out to save space on the drawing. Figs. 5, 6, and 7 are details, chiefly to show the return-bend. Fig. 8 in full lines shows part of the valve-seat of the distributing-chamber and some of its outlets, and in dotted lines part of the valve, the figure illustrating the different shapes of the passages. Fig. 9 is a modification showing the distributing-chamber attached directly to the separating-chamber. Fig. 10 is a vertical sectional view of the apparatus shown in Figs. 1 and 2, taken on the line $x\ x$, Fig. 2.

Having shown my invention as applied to an apparatus such as specified, I will say that $B'\ B^2\ B^3$ represent heating-chambers; $A'\ A^2\ A^3$, separating-chambers connected therewith, and $D'\ D^2\ D^3$ vapor-pipes leading from the separating-chamber of one effect to the heating-chamber of the next effect to convey the vapor given off by the hot liquid in a separating-chamber of the heating-chamber of the following effect, so as to fully utilize the heat of the steam and vapor in one effect after the other in succession. These parts are substantially the same in construction and operation as in the said Patent No. 383,384, so need not herein be further described.

In the patent referred to the receiving ends of the heating-chambers had peculiar heads or covers having partitions forming cells adapted to serve the purpose of usual return-bends to unite the proper tubes to form coils. Herein I have dispensed with such heads and instead I have provided an improved return-bend E, (shown separately in Figs. 5, 6, and 7,) and viewing Fig. 5 the tube-sheet $b$ has in it two tubes $b\ b$, which extend through the sheet and receive over their ends the return-bend E, it having a partition $e$, and a screw-threaded opening $e'$, suitably threaded for the reception of a plug $e^2$ when it is desired to close the bend. The tube-sheet under the partition $e$ is tapped for the reception of a stud-bolt $e^3$, over which the partition is placed, the said bolt receiving upon its end a cap-nut $e^4$, by which to retain the bend firmly in place against the tube-sheet and also protect the screw. The outer end of each separating-chamber, as best shown enlarged in Fig. 3, has a depending flange $a$ and a cross-piece $a'$, provided with suitable holes to receive bolts $a^2$, by which, as shown in Fig. 3, to attach thereto a straining-chamber F, a part of which, as shown in Figs. 1 to 4, forms the distributing-chamber G, the construction of said parts being such as to form a continuous passage between the usual separating-chamber and the distributing-chamber; but instead of interposing the straining-chamber, as stated, the distributing-chamber may be connected directly to the separating-chamber head, as shown in Fig. 9. The cross-piece $a'$ has other holes, one of which is shown at $a^3$, for the reception of suitable bolts by which to connect to the separating-chamber its usual cover.

The strainer F' may be made from one or a series of layers of gauze, perforated plate, or other usual material.

The distributing-chamber G, as shown in Fig. 3, is represented as within a continuation of the straining-chamber. The down-turned open portion or exit-passage of the casting forms the walls of the distributing-chamber G, and also serves the purpose of receiving the bolts $g\ g$, which support the valve-seat or bottom portion $g'$ of the distributing-chamber. To enable the connection to the valve-seat of a greater number of distributing-tubes for a given area, and also to enable any wear of the valve $g^{10}$ to be compensated for the said seat is made V-shaped, and the face of the valve is of corresponding shape. In Fig. 3 it will be seen that the said valve does not bottom at its extreme lower end, but a channel $g^2$ is left for the reception of any gritty sediment should such be present by accident in the liquid being treated. The valve is kept seated on the V-shaped faces of the seat by gravity; but, if desired, it may be kept down by a cap $g^3$, through which is extended a stud-bolt $g^4$, rising from the said seat.

Referring to Fig. 8, the round holes 2 represent openings or exits from the seat, there being in practice as many such openings as there are distributing tubes or coils in the following effect; but the passages 3 in the valve are elliptical, as shown by dotted lines. The valve is provided with an upturned lug $g^{15}$, to which is loosely connected a valve-rod $g^5$, extended outwardly through a suitable stuffing-box $g^6$, and provided with a handle $g^7$, by which to move the valve, as desired. The seat $g'$ contains, as shown in Fig. 4, a stop $g^8$, located to arrest the valve in its extreme open position, and at or near its other end I have provided an adjustable regulating device $g^9$, (shown as a screw,) the position of said device determining the effective area of each passage leading from the distributing-chamber G to the coils of the folowing effect. It will be noticed from the shape of the hole 3 in the valve that the farther the valve is moved to the right the less will be the effective area of the passages referred to, and vice versa. The regulating device $g^9$ having been adjusted for the quantity of liquid to be delivered, the valve will be moved to the right against said device; but in case of any clogging of any of the feed-passages the valve may be quickly moved in the opposite direction for an instant to clear the passage and be quickly moved back into just the proper position to continue the uniform feed into the following effect. It will be understood that each distributing-tube H, in communication with the distributing-chamber and with a coil of a following effect, will be uniformly fed, and it will also be understood that the liquid passing into each following effect is made to flow therein by a force due not only, as usual, to the difference in vacuum of the different effects, but also due to the force of gravity of the liquid, which force is continuously, and not intermittently, exerted, as heretofore.

The liquid to be treated may be fed through the coils of each heating-chamber from like distributing-chambers. The steam enters the chamber B' through the pipe I and water of condensation therein may go to any usual trap through pipe 5, and water of condensation may be led from chamber $B^2$ to $B^3$ by pipe 6 and issue from $B^3$ through pipe 7. The sirup or other concentrate may be delivered from the last effect through a pipe 8.

Suitable packing will be interposed between the return-bend and where it contacts with the tube-sheet.

I claim—

1. An evaporating apparatus containing adjacent heating-chambers arranged in series of two or more, a distributing-chamber interposed between a separating-chamber of one effect and a heating-chamber of the next effect, a continuous horizontal delivery-channel in the bottom of the distributing-chamber, a series of independent distributing-pipes leading from the bottom of the said channel, the delivery ends of said pipes being connected one to each coil of a following effect, and a valve to simultaneously control the admission of a uniform quantity of liquid from the said distributing-chamber into each distributing pipe and coil, substantially as described.

2. In an evaporating apparatus, a distributing-valve having a series of openings and a series of distributing-pipes connected with the seat of the chamber on which the said valve is made movable and registering with the openings therein, combined with a series of coils, one for the delivery end of each of said distributing-pipes and adapted to be fed uniformly by adjustment of one and the same valve, substantially as described.

3. A distributing-chamber, a many-ported valve extended longitudinally therein, and a series of independent distributing-pipes in communication with said chamber and each under the control of the said valve, combined with a fixed stop and an adjustable regulating device for limiting positively the throw of the said valve, substantially as described.

4. A distributing-chamber, a many-ported valve extended longitudinally therein, and a series of distributing-pipes in communication with said chamber and under the control of the said valve, each pipe having its own ports, the openings in the said valve and seat being of elliptical and circular shape, substantially as described, to enable the liquid-passages to be kept substantially circular, thereby insuring uniform flow without clogging, substantially as described.

5. An evaporating apparatus containing the following instrumentalities, viz: two or more heating-cylinders and separating-cylinders arranged in vertical series of two or more, a distributing-chamber for each effect, a many-ported valve therein controlled externally, and a series of distributing-pipes, one for each coil of each effect and controlled each by a port and under the control of the said valve to insure a uniform supply of liquid from the distributing-chamber directly into each coil, the said parts being arranged substantially as represented, whereby the liquid is at all times aided by gravity in its passage from one to the other effects, as set forth.

In testimony whereof I have signed my name to this specification in the presence of two subscribing witnesses.

OSCAR B. STILLMAN.

Witnesses:
GEO. W. GREGORY,
ANNIE S. WIEGAND.